(12) United States Patent
Chen et al.

(10) Patent No.: US 7,386,353 B2
(45) Date of Patent: Jun. 10, 2008

(54) PARALLEL CONTROL METHOD FOR SEQUENTIAL PROCESS CONTROL FLOW

(75) Inventors: Yi-Da Chen, Taipei (TW); Yao-Hsiung Chang, Hsinchu (TW); Dan Ho, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 884 days.

(21) Appl. No.: 10/831,889

(22) Filed: Apr. 26, 2004

(65) Prior Publication Data

US 2005/0240929 A1    Oct. 27, 2005

(51) Int. Cl.
*G05B 11/01* (2006.01)
(52) U.S. Cl. .......................................... 700/11; 700/23
(58) Field of Classification Search ................... 700/11
See application file for complete search history.

(56) References Cited

U.S. PATENT DOCUMENTS

| | | | |
|---|---|---|---|
| 5,774,355 A * | 6/1998 | Mizuno et al. | 700/23 |
| 6,195,590 B1 * | 2/2001 | Powell | 700/36 |
| 6,256,598 B1 * | 7/2001 | Park et al. | 703/2 |
| 6,303,395 B1 * | 10/2001 | Nulman | 438/14 |
| 6,823,227 B2 * | 11/2004 | Yamada et al. | 700/99 |
| 2003/0158618 A1 * | 8/2003 | Browning | 700/99 |
| 2003/0211640 A1 * | 11/2003 | Orimoto | 438/14 |
| 2003/0216950 A1 * | 11/2003 | Chen | 705/8 |
| 2004/0072478 A1 * | 4/2004 | Sticht et al. | 439/894 |
| 2005/0085927 A1 * | 4/2005 | Yamada et al. | 700/11 |

* cited by examiner

*Primary Examiner*—Thomas K Pham
(74) *Attorney, Agent, or Firm*—Thomas, Kayden, Horstemeyer & Risley

(57) ABSTRACT

A parallel control method for sequential process control flow. First, a parallel step including a plurality of independent sub-steps is generated in a sequential process control flow. One of the sub-steps is directed to execute at a time, and any sub-step gains the right to execute when the other sub-steps are in waiting state. It is assessed the parallel step is complete by whether all of the sub-steps are complete, and the sequential process control flow is controlled to a next step succeeding the parallel step if the parallel step is complete.

12 Claims, 8 Drawing Sheets

PARALLEL CONTROL METHOD FOR SEQUENTIAL PROCESS CONTROL FLOW

BACKGROUND

The present invention relates to process flow control, and particularly to a parallel control method for sequential process control flow of equipment automation.

The process control flow of equipment automation follows a series of pre-defined steps to process products, such as on lot-based wafers in a foundry, to ensure that wafers are processed in a correct sequence of steps or operations. The flow starts as FOUP (carrier) loaded on equipment and terminates as FOUP unloaded from equipment. Each pre-defined step performs specific operations on equipment, MES (Manufacturing Execution System) or other related servers. The basic steps include steps, such as "AskReadLotTag" to read the smart tag of FOUP, "LotVerfy" to verify the status of lots in FOUP with MES, "AskProceedWithCarrier" to ask equipment to dock FOUP, "OperationStart" and "OperationComplete" to track in and track out FOUP with MES, "AskStartProcess" to create jobs on equipment for wafer processing on lot-based, and some enhancement steps.

FIG. 1 illustrates an example of a sequential process control flow 100 in wafer fabrication. In the example, the sequential process control flow 100 has 12 steps including "AskReadLotTag", "LotVerfy", "EQPStatusCheck", "RMSCheck", "ECSCheck", "PMSCheck", "AskProceedWithCarrier", "ReportDockComplete", "ReportSlotMap", "AskWriteLotTag", "OperationStart", and "AskStartProcess", respectively. A step can be executed only when the previous one is completed normally or skippable. For example, the "AskStartProcess" step can be performed only when FOUP is tracked in with MES successfully. Thus, the process control flow of equipment automation is a sequential flow composed of several distinct steps according to the behavior of equipment and the process requirements.

The major advantage of such sequential flow is to guarantee wafers are processed by definite order of steps or operations without errors. Generally, when FOUP is processed by a step, it implies that the steps before it have all been completed normally. If an exception occurs in that step, such sequential flow can guarantee that the steps before it are all executed completely and determine a proper procedure to recover or resolve the issue after exception. For example, if an exception occurs in the "OperationComplete" step, it implies that FOUP is already tracked in MES and processed by equipment. Therefore, the exception handling procedure of this step is first undocking FOUP and keeping FOUP on load port and then sending an alarm to inform related personnel for subsequent handling. Besides, such sequential flow allows only one step or operation to execute in one time. This behavior can guarantee the execution of each step is in a controllable and traceable state. If exception occurs in a step, it can be handled immediately without waiting to ensure the safety of the wafer processing. For example, if at least two steps are executing in the same time by the technology of multi-thread, exceptions in a step is hard to be handled immediately because it doesn't have proper timing to synchronize all the status of the steps in executing at that moment. When all the steps finish execution, the process control flow might be out of control and lead to miss operation if exceptions are not recorded correctly. Such concerns can be solved easily in a sequential process control flow.

The major disadvantage of current process control flow, however is long processing time for the entire sequential process control flow, and the extended processing time for a FOUP on equipment when a new step or operation is added to the process control flow. For example, if a new APC (Advanced Process Control) step or operation which takes 10 seconds to complete is added into a current photo process control flow, photo equipment processing time is extended by exactly 10 seconds for a FOUP. Thus, a process control flow performance suffers when additional steps or operations are added.

SUMMARY

The present invention is proposed to address and solve the aforementioned issues. It should be noted that, although this invention is disclosed herein from the perspective of an IC foundry, its concept and spirit are not limited to IC foundries but may be applicable to other factories, service suppliers and products.

Accordingly, it is an object of the present invention to provide a parallel control method for sequential process control flow that parallels the execution of independent steps or operations in a sequential process control flow and ensures the execution of independent steps in parallel processing is in total control without mistakes at the same time.

To achieve the above object, the present invention provides a parallel control method for sequential process control flow, which utilizes the idle time of a step or operation for waiting acknowledgements to improve the performance of sequential process control flow while keeping the major advantage of it. First, a parallel step including a plurality of independent sub-steps is generated in a sequential process control flow. This parallel step is embedded an algorithm called parallel controller to control and parallel the process of its sub-steps without safety issues. In order to keep the execution of sub-steps in a controllable and traceable state, sub-steps are executed one at a time, and any sub-step gains the right to execute when the other sub-steps are in a waiting state. To preserve the feature of sequential process control flow, the parallel step is determined as complete when all of the sub-steps are complete, and the sequential process control flow proceeds to a next step succeeding the parallel step if the parallel step is complete.

The parallel step further releases the right of execution if all of the sub-steps are in a waiting state, and is activated if an acknowledgement of one sub-step in the waiting state is received, and directs the sub-step indicated by the acknowledgement to execute in a message-driven framework.

The sequential process control flow is further suspended if any sub-step completes with an exception, and the sub-step having the exception is indicated and reported for exception recovery to avoid miss operation.

The above-mentioned method may take the form of program code embodied in tangible media. When the program code is loaded into and executed by a machine, the machine becomes an apparatus for practicing the invention.

BRIEF DESCRIPTION OF THE DRAWINGS

The aforementioned objects, features and advantages of this invention will become apparent by referring to the following detailed description of the preferred embodiment with reference to the accompanying drawings, wherein.

DESCRIPTION

The present invention provides a system and method overcoming conventional sequential process control flow problems.

As will be appreciated by persons skilled in the art from the discussion herein, the present invention has wide applicability to many manufacturers, factories, and industries. For discussion purposes, while disclosed embodiments reference semiconductor foundry manufacturing (i.e., wafer fabrication in an IC foundry), the present invention is not limited thereto.

Figure 1:
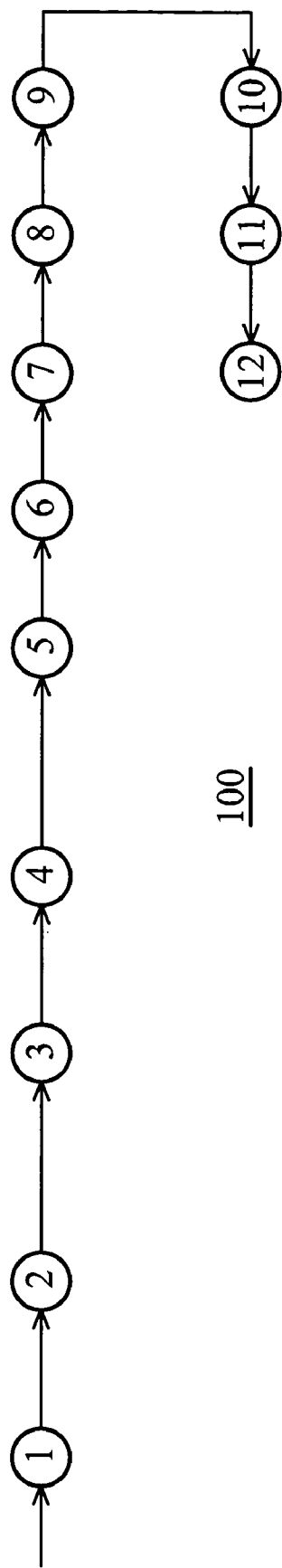
FIG. 1 is a schematic diagram of a sequential process control flow.
Figure 2:
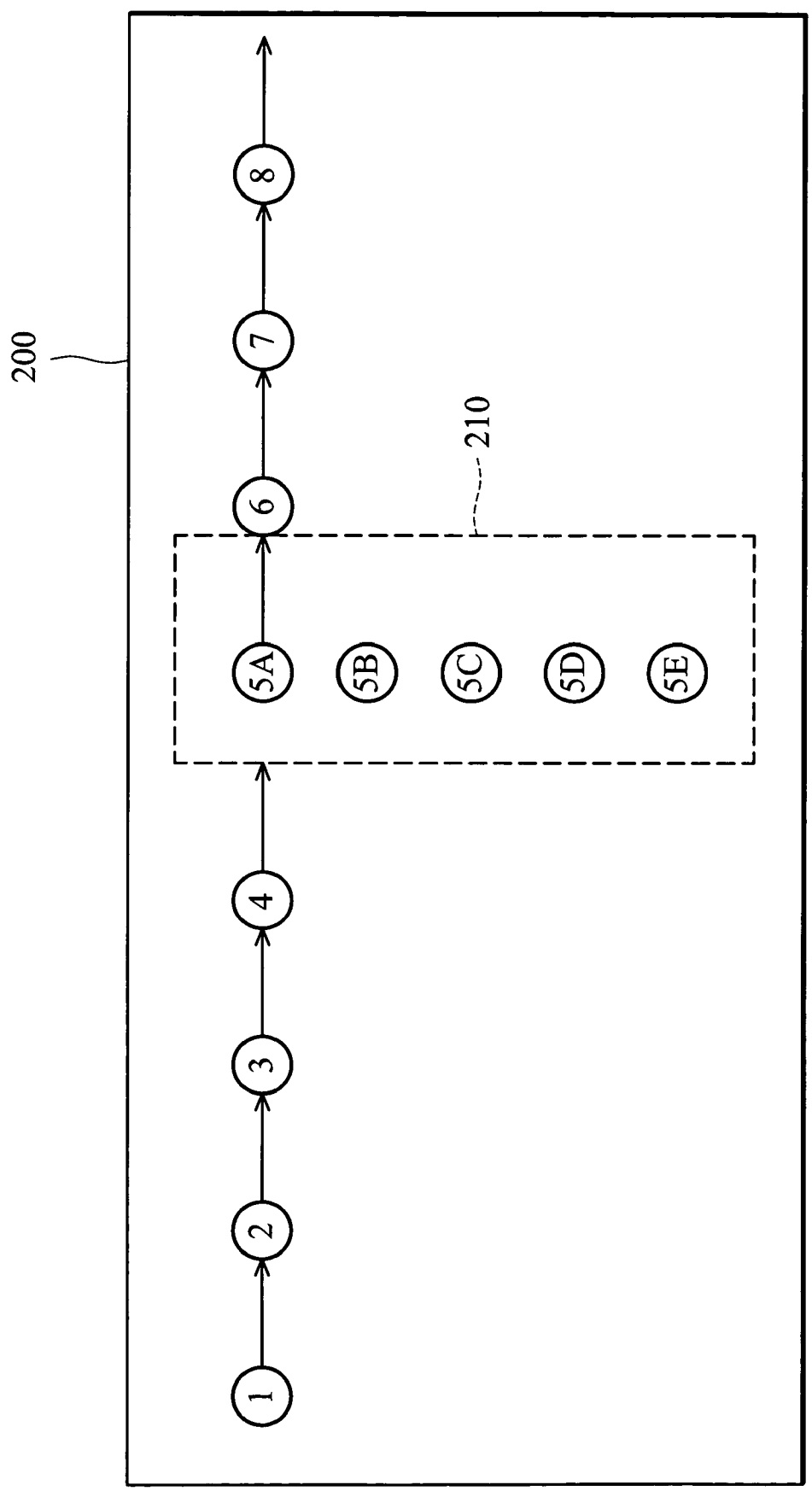
FIG. 2 is a schematic diagram illustrating a sequential process control flow having a parallel step according to the present invention.

In the present invention, at least one new step, called parallel step is generated in a sequential process control flow. The independent steps which have same exception handling procedures and same relative position to the steps before and after parallel step in the original sequence process control flow are dropped down as sub-steps of the parallel step, and the state of the parallel step is determined by that of each sub-step. The sequence of the process control flow proceeds to the next step succeeding the parallel step if all of the sub-steps are normally complete. FIG. 2 illustrates a sequential process control flow 200 having a parallel step 210 according to the present invention. As shown in FIG. 2, the sequential process control flow 200 has 8 steps including the parallel step 210. The parallel step 210 has 5 sub-steps 5A-5E.

In wafer fabrication, steps "RMSCheck", "PMSCheck", "ECSCheck", "ReportDockComplete" and "ReportSlotMap" are executed one by one in a sequential flow and require an average 56.5 seconds for completion of all steps. The steps "ReportDockComplete" and "ReportSlotMap" however are simply waiting equipment to dock FOUP for slot mapping, and such a mechanical movement requiring exactly 39.23 seconds to be completed. During the waiting period, the process control program is totally idle without any performance if no other FOUP are on load ports. Additionally, since the steps "RMSCheck", "PMSCheck", "ECSCheck", "ReportDockComplete" and "ReportSlotMap" are independent and have same relative position to the steps before and after parallel step, the steps "RMSCheck", "PMSCheck" and "ECSCheck" can be executed at that time while waiting equipment to dock FOUP and report slot map for the step "ReportDockComplete" and "ReportSlotMap" without any safety issues. In this case, the steps "PMSCheck", "ECSCheck", "RMSCheck", "ReportDockComplete" and "ReportSlotMap" are sub-steps 5A-5E of the parallel step 210 in FIG. 2.

Figure 3:
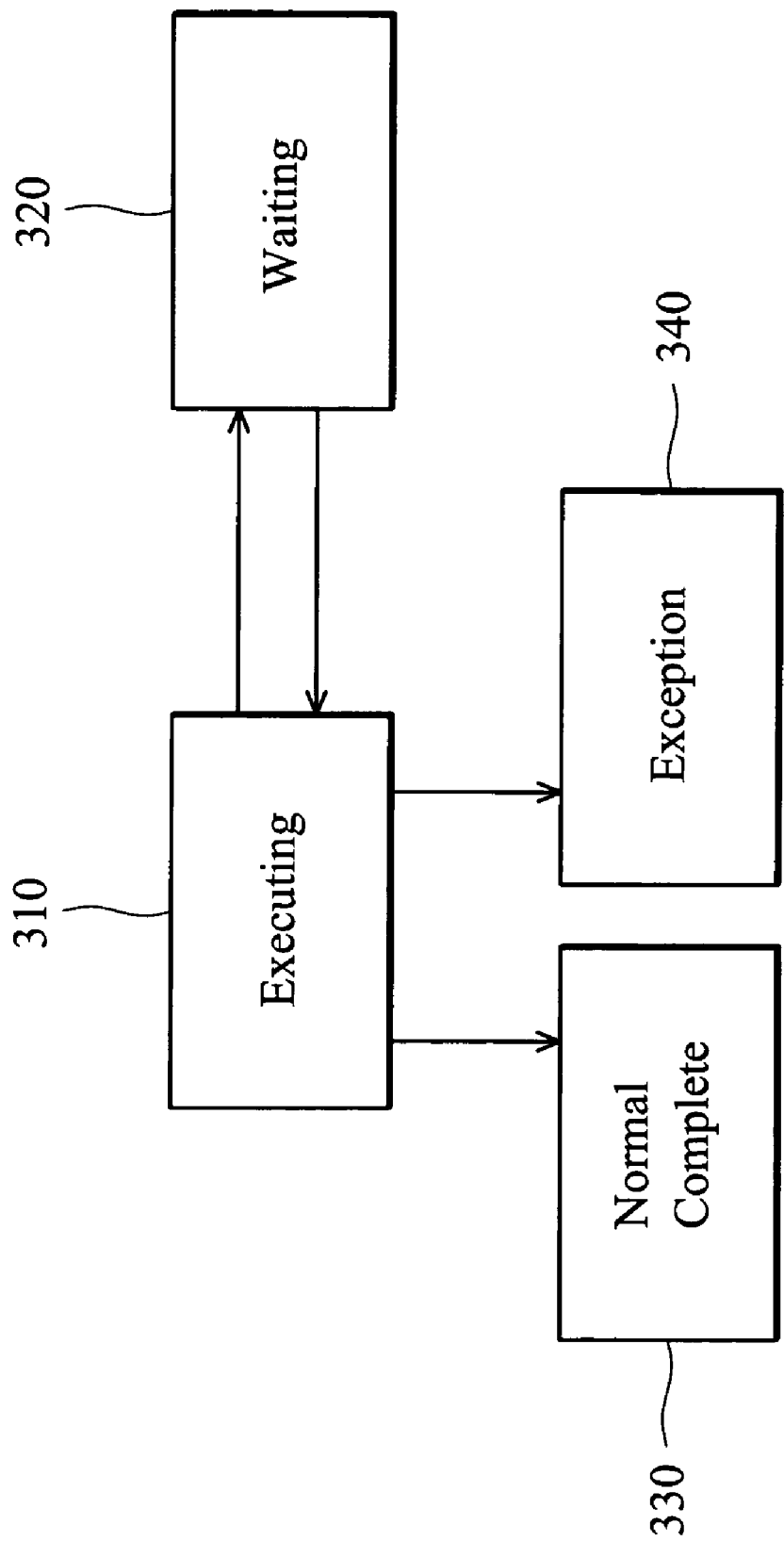
FIG. 3 is a schematic diagram illustrating step states according to the present invention.

FIG. 3 illustrates step states according to the present invention. Each step or sub-step has 4 states including Executing 310, Waiting 320, Normal Complete 330 and Exception 340. Generally, after one sub-step is executed, it may be normally completed and enter Normal Complete state 330, or enter Waiting state 320 to await acknowledgement from equipment, MES or other related servers. If a failure or exception occurs in the sub-step, the sub-step enters Exception state 340. It is noted that a step or sub-step is in the state of Executing 310 or Waiting 320 as it is in processing. Each sub-step may gain the right to execute when the other sub-steps are in Waiting state 320.

Figure 4:
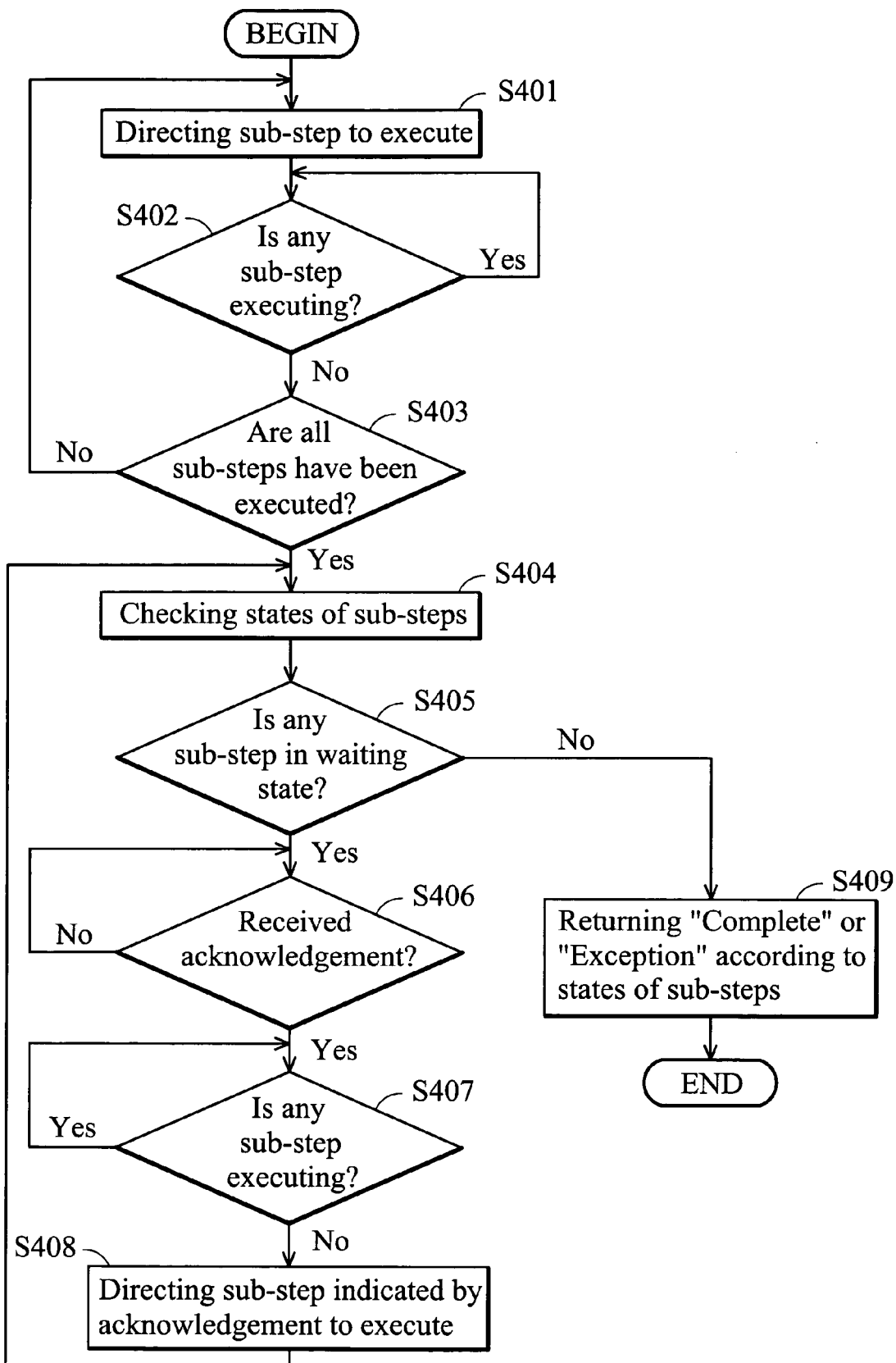
FIG. 4 is a flowchart showing the process of the parallel control method realized as a parallel step for sequential process control flow according to a first embodiment of the present invention.

FIG. 4 shows the process of the parallel control method realized as a parallel step for sequential process control flow according to a first embodiment of the present invention.

First, in step S401, one of the sub-steps is directed to execute. It is noted that the sub-step is selected randomly or according to a predefined order, and the order is defined according to execution time and behavior of respective sub-steps. In step S402, it is determined whether any sub-step is still executing. If yes, the flow remains in step S402. Otherwise, in step S403, it is determined whether all of the sub-steps have been executed. If not (No in step S403), the flow returns to step S401, and selects another unexecuted sub-step for execution. It is understood that each sub-step should be in processing, and each sub-step may gain the right to execute when the other sub-steps are in a waiting state.

If yes (Yes in step S403), in step S404, the states of respective sub-steps are checked. If any sub-step is still in a waiting state (Yes in step S405), in step S406, it is determined whether any acknowledgement is received. If an acknowledgement is received and there is no sub-step is executing (Yes in step S406 and No in step S407), in step S408, the sub-step indicated by the acknowledgement is directed to execute. Additionally, if no sub-steps are in a waiting state (No in step S405), in step S409, the state of the parallel step is returned as "Normal Complete" if the states of all sub-steps are "Normal Complete" or "Exception" if the state of any sub-step is "Exception". It is understood that if the parallel step is normally completed, the sequential process control flow goes to next step succeeding the parallel step. Otherwise, the sequential process control flow is suspended, and the sub-step having the exception is reported and related personnel are informed for exception recovery.

Since equipment may have several load ports handling FOUP at the same time, the performance of the process control program can be further improved if the state of one parallel step is "Waiting" in a message-driven framework. In a second embodiment of the present invention, a parallel controller of the parallel step is introduced to control the parallel process of independent steps in the sequence process control flow. The parallel controller has an initial procedure to initialize the processing of each sub-step, and a be-prompted procedure to activate the sub-step process after receiving the acknowledgement of the sub-step from equipment or related servers.

Figure 5:
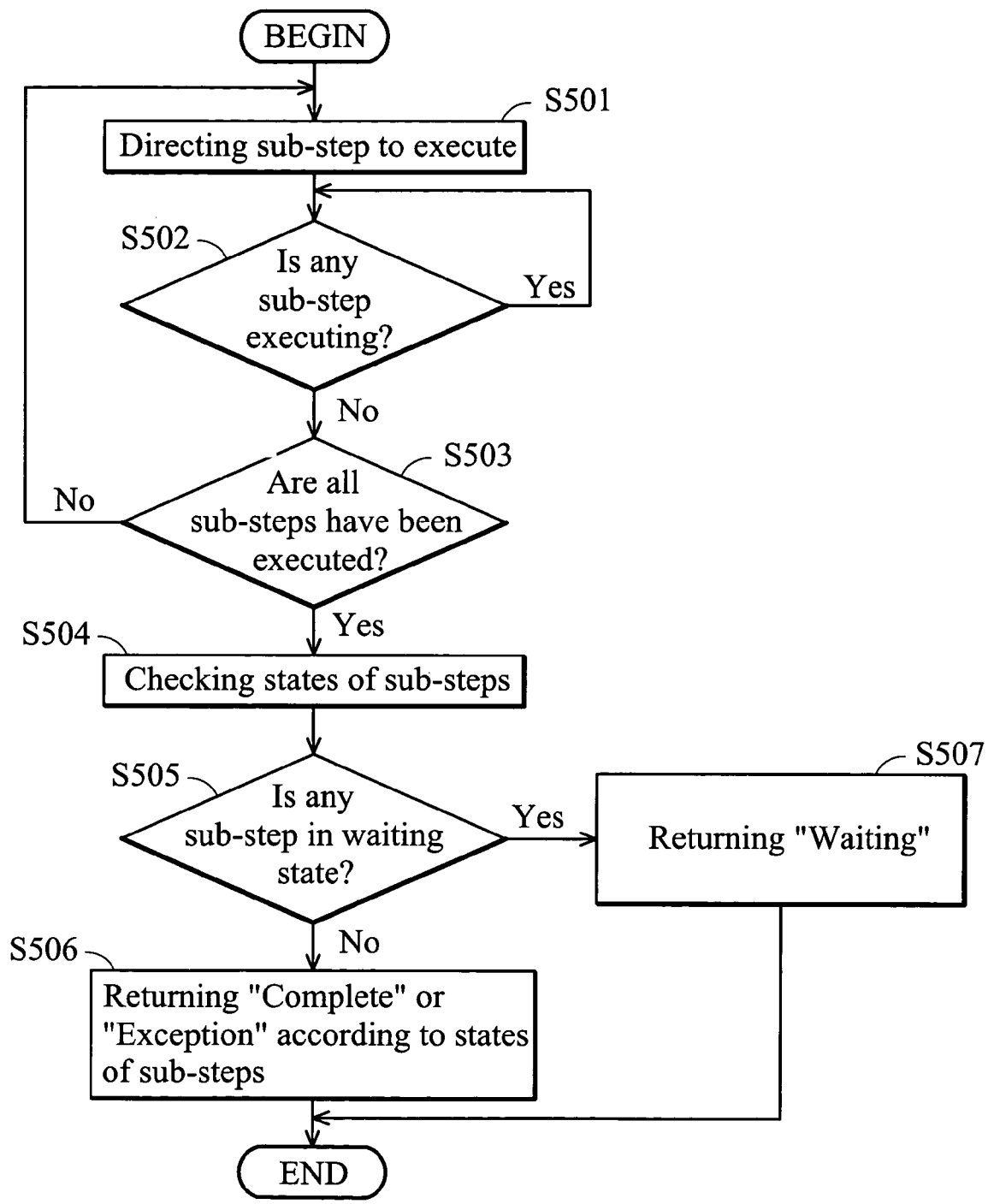
FIG. 5 is a flowchart showing an initial procedure of a parallel controller inside parallel step according to a second embodiment of the present invention.

FIG. 5 shows the initial procedure according to the second embodiment of the present invention.

In step S501, the initial procedure directs one of the sub-steps to execute. Similarly, the sub-step is selected randomly or according to execution time and behavior of respective sub-steps. Then, in step S502, the initial procedure determines whether any sub-step is still executing. If yes, the flow remains in step S502. Otherwise, in step S503, the initial procedure determines whether all of the sub-steps have been executed. If not (No in step S503), the flow returns to step S501, and the initial procedure selects another unexecuted sub-step for execution. It is also understood that each sub-step should be in processing, and each sub-step may gain the right to execute when the other sub-steps are in a waiting state.

If yes (Yes in step S503), in step S504, the initial procedure checks the states of respective sub-steps. If any sub-step is still in a waiting state (Yes in step S505), in step S507, the initial procedure returns the state of the parallel step to "Waiting", and releases the right of execution to the main process control program. At this time, the main process control program can give the right to other load ports for processing. If there are no sub-steps in a waiting state (No in step S505), in step S506, the initial procedure returns the state of the parallel step as "Normal Complete" if the states of all sub-steps are "Normal Complete" or "Exception" if the state of any sub-step is "Exception". Similarly, the main process control program controls the sequential process control flow to proceed to the next step succeeding the parallel step depending on the "Normal Complete" state of the parallel step. Otherwise, the main process control program suspends the sequential process control flow, and reports and informs the sub-step having the exception to related personnel for exception recovery.

Figure 6:
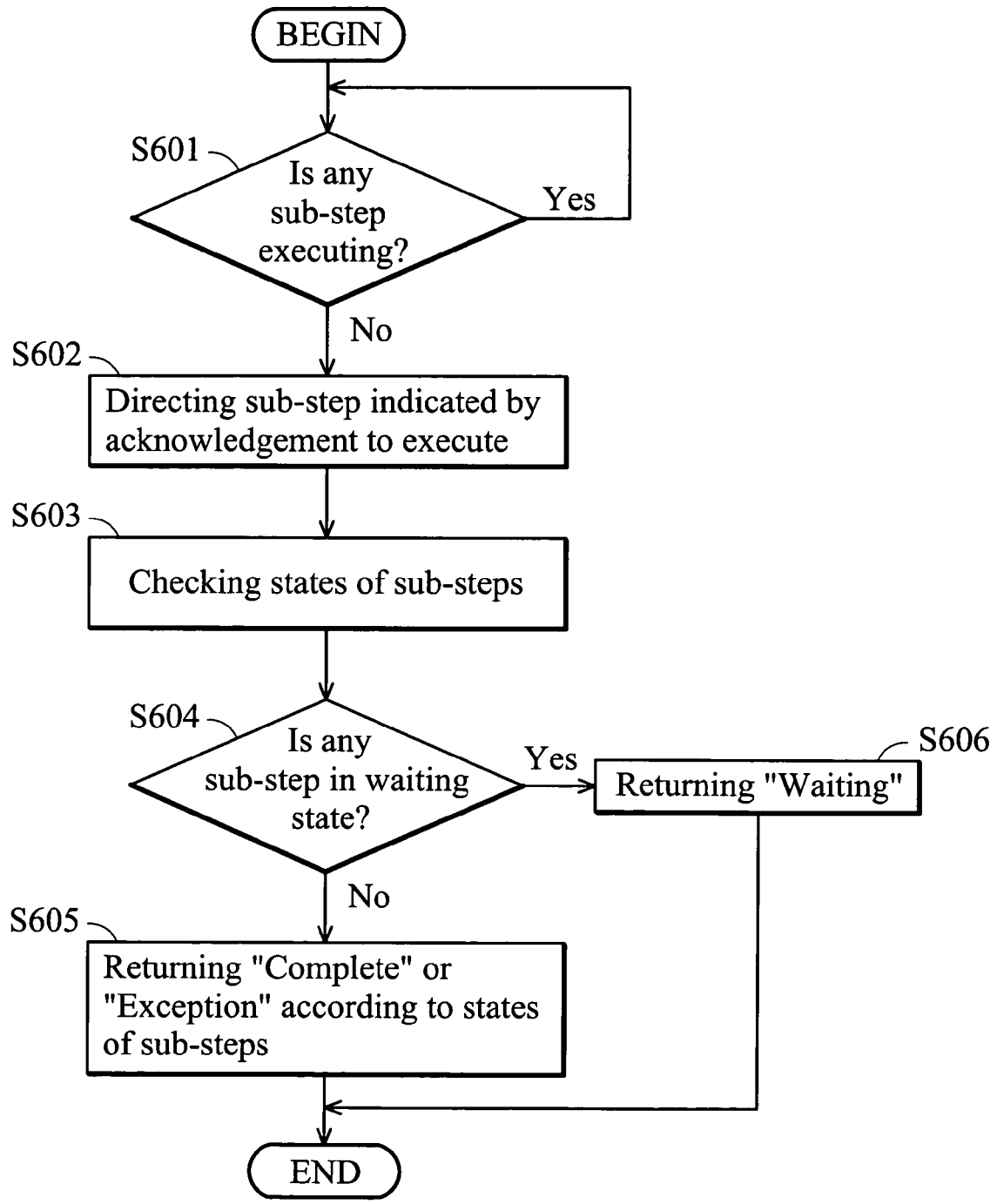
FIG. 6 is a flowchart showing a be-prompted procedure of a parallel controller inside parallel step according to a second embodiment of the present invention.

FIG. 6 shows the be-prompted procedure according to the second embodiment of the present invention. After receiving an acknowledgement, the main process control program activates the be-prompted procedure of the parallel controller inside parallel step to control following processes of the sub-steps.

After the parallel controller is awakened, in step S601, the be-prompted procedure determines whether any sub-step is still executing. If yes, the flow remains in step S601. Otherwise, in step S602, the be-prompted procedure selects the sub-step indicated by the received acknowledgement to execute. Thereafter, in step S603, the be-prompted procedure checks the states of respective sub-steps. If any sub-step is still in a waiting state (Yes in step S604), in step S606, the be-prompted procedure returns the state of the parallel step as "Waiting", and releases the right of execution to the main process control program. Similarly, the main process control program can give the right to other load ports for processing. If there are no sub-steps in a waiting state (No in step S604), in step S605, the be-prompted procedure returns the state of the parallel step as "Normal Complete" if the states of all sub-steps are "Normal Complete" or "Exception" if the state of any sub-step is "Exception". It is understood that the main process control program controls the sequential process control flow to go to the next step succeeding the parallel step depending on the "Normal Complete" state of the parallel step. Otherwise, the main process control program suspends the sequential process control flow, and reports and informs the sub-step having the exception to related personnel for exception recovery.

Figure 7:
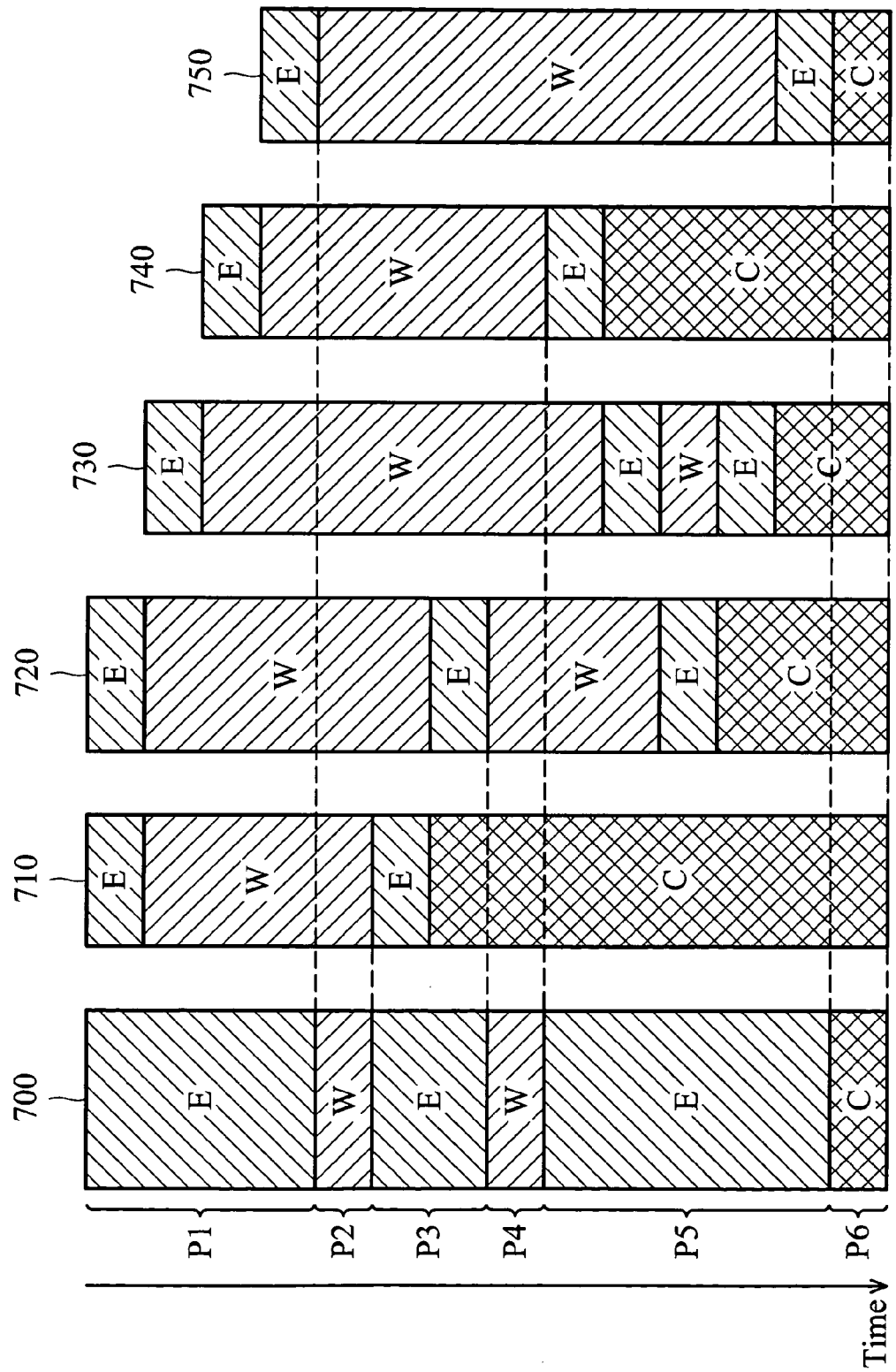
FIG. 7 is an execution example according to the present invention.

FIG. 7 is an execution example in wafer fabrication according to the present invention. The pillars 700~750 respectively represent the state situations of the parallel step and sub-steps 5A~5E in FIG. 2, in which "E", "W" and "C" represent Executing, Waiting and Normal Complete states, respectively. In period P1, the initial procedure directs each sub-step to execute at a time until all of the sub-steps have been executed. In periods P3 and P5, each sub-step indicated by corresponding acknowledgement can gain the right to execute. In periods P2 and P4, the right of execution is released to the main process control program for handling other load ports since all sub-steps are in waiting state. After period P5, the parallel step is complete since all sub-steps are complete.

Figure 8:
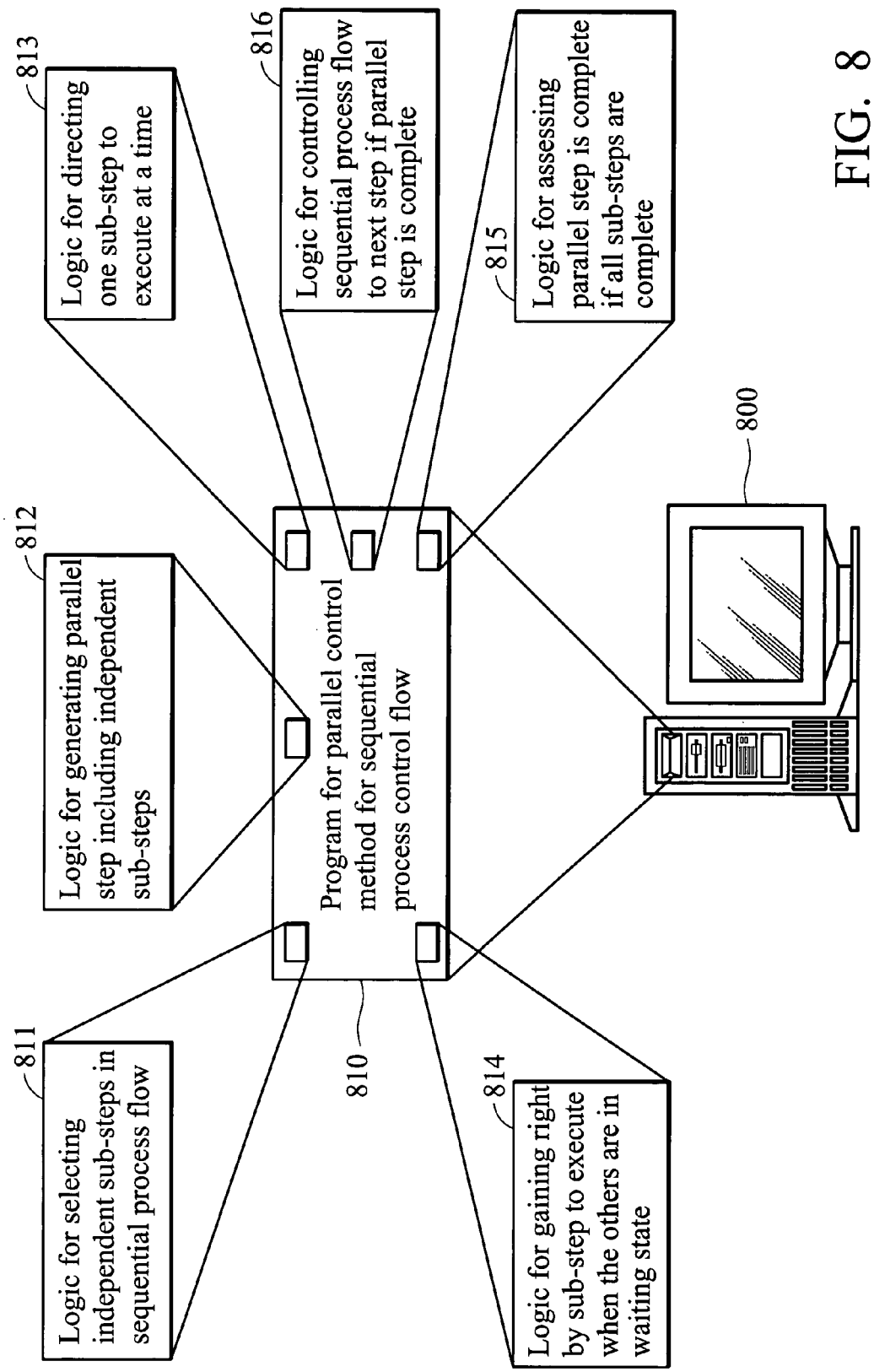
FIG. 8 is a schematic diagram of a storage medium for storing a computer program providing the parallel control method for sequential process control flow.

FIG. 8 is a schematic diagram of a storage medium for storing a computer program providing the parallel control method for sequential process control flow according to the present invention. The computer program product comprises a storage medium 810 having computer readable program codes embodied in the medium for use in a computer system 800, the computer readable program codes comprising at least a computer readable program code 811 for selecting a plurality of independent sub-steps in a sequential process control flow, a computer readable program code 812 for generating a parallel step including the sub-steps in the sequential process control flow, a computer readable program code 813 for directing one of the sub-steps to execute at a time, a computer readable program code 814 for gaining right to execute by any sub-step when the other sub-steps are in waiting state, a computer readable program code 815 for assessing the parallel step is complete if all of the sub-steps are complete, and a computer readable program code 816 for controlling the sequential process control flow to a next step succeeding the parallel step if the parallel step is complete.

The present invention thus provides a parallel control method for sequential process control flow that parallels the execution of independent steps or operations in a sequential process control flow, thereby improving the performance of conventional process control flow of equipment automation, which maintaining the benefits or advantages of conventional sequential process control flow to guarantee products have been processed in definite order of steps or operations.

The method and system of the present invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The method and systems of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to application specific logic circuits.

Although the present invention has been described in its preferred embodiments, it is not intended to limit the invention to the precise embodiments disclosed herein. Those skilled in this technology can still make various alterations and modifications without departing from the scope and spirit of this invention. Therefore, the scope of the present invention shall be defined and protected by the following claims and their equivalents.

What is claimed is:

1. A parallel control method for sequential process control flow, comprising the steps of:
   selecting a plurality of independent sub-steps in a sequential process control flow;
   generating a parallel step including the sub-steps in the sequential process control flow;

during an execution of the parallel step, an execution right is provided, wherein only one of the sub-steps gains the execution right at a time;

directing one of the sub-steps to gain the execution right, and execute at a time;

when the executed sub-step enters to a waiting state, releasing the execution right, and gaining of the execution right by one of the sub-steps to execute;

assessing the parallel step is complete if all of the sub-steps are complete; and controlling the sequential process control flow to a next step succeeding the parallel step if the parallel step is complete.

2. The method of claim 1 further comprising releasing of the execution right by the parallel step if all of the sub-steps are in the waiting state.

3. The method of claim 2 further comprising activating the parallel step if an acknowledgement of one sub-step in the waiting state is received, and directing the sub-step indicated by the acknowledgement to have the execution right, and execute.

4. The method of claim 1 further comprising suspending the sequential process control flow if any sub-step completes with an exception.

5. The method of claim 4 further comprising indicating the sub-step having the exception for exception recovery.

6. The method of claim 1 further comprising directing the sub-steps to have the execution right, and execute according to an execution time and behavior of respective sub-steps.

7. A machine-readable storage medium storing a computer program which, when executed, directs a computer to perform a parallel control method for sequential process control flow, comprising the steps of:

selecting a plurality of independent sub-steps in a sequential process control flow;

generating a parallel step including the sub-steps in the sequential process control flow;

during an execution of the parallel step, an execution right is provided, wherein only one of the sub-steps gains the execution right at a time;

directing one of the sub-steps to gain the execution right, and execute at a time;

when the executed sub-step enters to a waiting state, releasing the execution right, and gaining of the execution right by one of the sub-steps to execute;

assessing the parallel step is complete if all of the sub-steps are complete; and controlling the sequential process control flow to a next step succeeding the parallel step if the parallel step is complete.

8. The storage medium of claim 7 further comprising releasing of the execution right by the parallel step if all of the sub-steps are in the waiting state.

9. The storage medium of claim 8 further comprising activating the parallel step if an acknowledgement of one sub-step in the waiting state is received, and directing the sub-step indicated by the acknowledgement to have the execution right, and execute.

10. The storage medium of claim 7 further comprising suspending the sequential process control flow if any sub-step completes with an exception.

11. The storage medium of claim 10 further comprising indicating the sub-step having the exception for exception recovery.

12. The storage medium of claim 7 further comprising directing the sub-steps to have the execution right, and execute according to an execution time and behavior of respective sub-steps.

* * * * *